(12) United States Patent
Zandwijk

(10) Patent No.: US 9,097,368 B2
(45) Date of Patent: Aug. 4, 2015

(54) PIPELINE LAYING VESSEL FOR LAYING A PIPELINE ON A SEABED

(75) Inventor: Cornelis Van Zandwijk, AA Leiden (NL)

(73) Assignee: HEEREMA MARINE CONTRACTORS NEDERLAND SE, Leiden (NL)

(*) Notice: Subject to any disclaimer, the term of this patent is extended or adjusted under 35 U.S.C. 154(b) by 0 days.

(21) Appl. No.: 14/009,085

(22) PCT Filed: Mar. 30, 2012

(86) PCT No.: PCT/NL2012/050213
§ 371 (c)(1),
(2), (4) Date: Sep. 30, 2013

(87) PCT Pub. No.: WO2012/134294
PCT Pub. Date: Oct. 4, 2012

(65) Prior Publication Data
US 2014/0227039 A1    Aug. 14, 2014

Related U.S. Application Data

(60) Provisional application No. 61/470,694, filed on Apr. 1, 2011.

(30) Foreign Application Priority Data

Apr. 5, 2011 (NL) ..................... 2006548

(51) Int. Cl.
*F16L 1/20* (2006.01)
*F16L 1/235* (2006.01)
*B63B 35/03* (2006.01)

(52) U.S. Cl.
CPC . *F16L 1/20* (2013.01); *B63B 35/03* (2013.01); *F16L 1/207* (2013.01); *F16L 1/235* (2013.01)

(58) Field of Classification Search
CPC .............. F16L 1/20; F16L 1/207; F16L 1/235; F16L 1/18; F16L 1/202; F16L 1/123; B63B 35/00; B63B 35/03; B63B 21/04
USPC ........ 405/156, 158, 166, 168.1, 168.2, 168.4, 405/169, 170, 184.1, 184.4, 184.5
See application file for complete search history.

(56) References Cited

U.S. PATENT DOCUMENTS 6,184,493 B1 * 2/2001 Tsuchiya ...................... 219/161
6,450,385 B1 * 9/2002 Guerin ........................... 226/89

(Continued)

FOREIGN PATENT DOCUMENTS

FR          2030480 A5    11/1970

OTHER PUBLICATIONS

Netherlands search report for application No. 2006548 dated Dec. 30, 2011.

(Continued)

*Primary Examiner* — John Kreck
*Assistant Examiner* — Carib Oquendo
(74) *Attorney, Agent, or Firm* — Patterson & Sheridan, L.L.P.

(57) ABSTRACT

A pipeline laying vessel for laying a pipeline (5) on a seabed, which pipeline laying vessel comprises a hull, a positioning device (6) for positioning a pipe section in a firing line (3) along which the pipeline is laid, which positioning device is supported by the hull, and a clamp (17) for holding the pipeline suspended from the vessel, wherein the clamp is located in the firing line, and comprises a support device (18) constructed and arranged to allow the clamp to hold the pipeline in a first mode wherein the clamp has a fixed position relative to the positioning device, and in a second mode (52) wherein the clamp is pivotable relative to the positioning device.

19 Claims, 12 Drawing Sheets

(56) References Cited

U.S. PATENT DOCUMENTS

Figure 1:
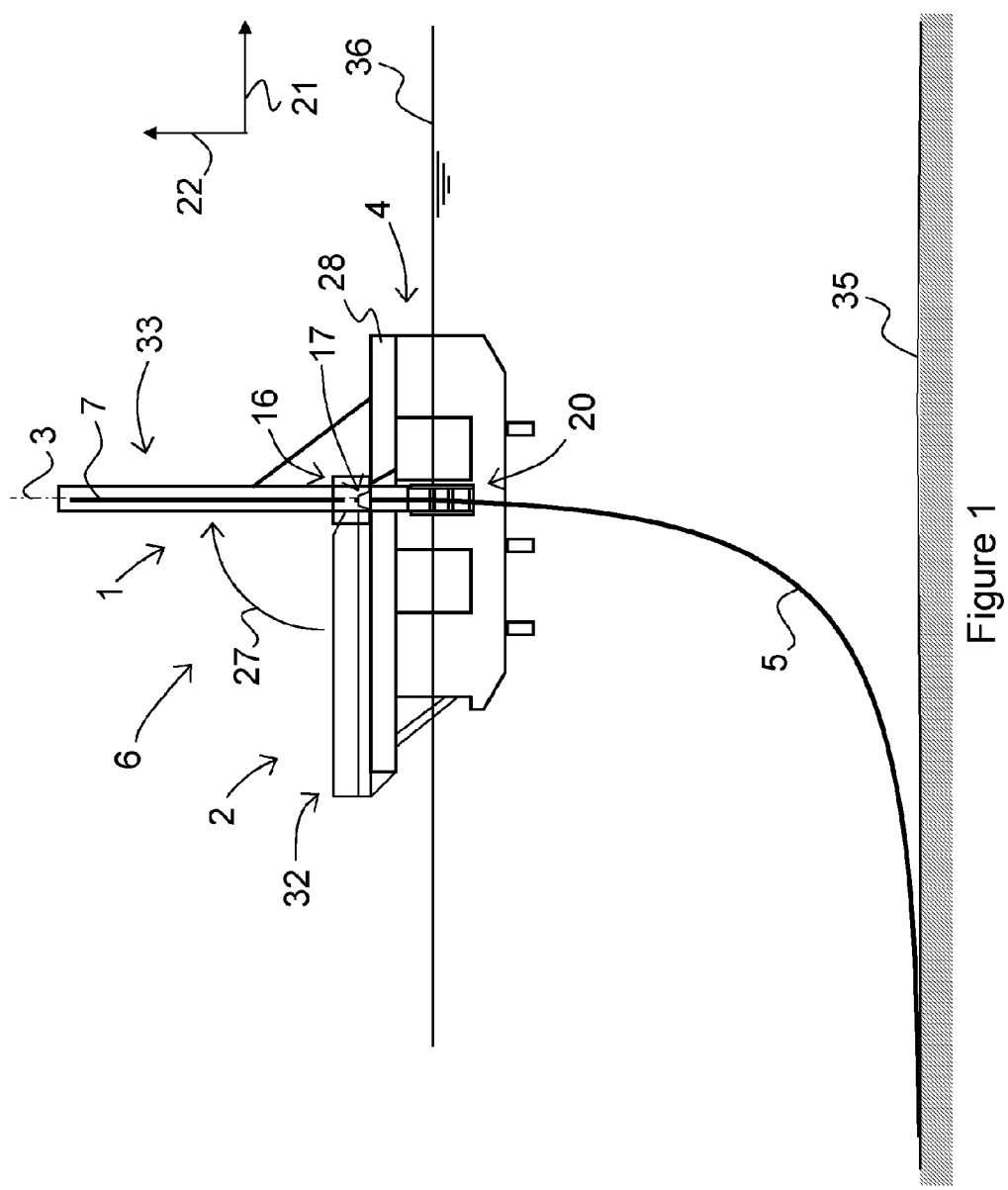

| | | | |
|---|---|---|---|
| 7,063,485 B2 * | 6/2006 | Jordan et al. | 405/224.4 |
| 2007/0264084 A1 * | 11/2007 | Signaroldi et al. | 405/158 |
| 2008/0112762 A1 * | 5/2008 | van Zandwijk et al. | 405/166 |
| 2010/0104370 A1 * | 4/2010 | van Egmond | 405/156 |
| 2010/0310319 A1 | 12/2010 | Pionetti | |
| 2011/0188941 A1 * | 8/2011 | Tame | 405/166 |

OTHER PUBLICATIONS

International search report for application No. PCT/NL2012/050213 dated May 9, 2012.

* cited by examiner

PIPELINE LAYING VESSEL FOR LAYING A PIPELINE ON A SEABED

This application is the National Stage of International Application No. PCT/NL2012/050213, filed Mar. 30, 2012, which claims benefit of Netherlands Patent Application No. 2006548, filed Apr. 5, 2011, and which claims benefit of U.S. Provisional Application No. 61/470,694, filed Apr. 1, 2011.

The invention relates to a pipeline laying vessel for laying a pipeline on a seabed, which pipeline laying vessel comprises a hull, a positioning device for positioning a pipe section in a firing line along which the pipeline is laid, which positioning device is supported by the hull, and a clamp for holding the pipeline suspended from the vessel. The clamp is located in the firing line.

The pipeline is laid by positioning a first pipe section in the firing line while using the positioning device. The positioning device may comprise a J-lay tower extending upwardly from the hull in combination with a loader for moving a pipe section into the tower. The positioning device may comprise a substantially horizontal extending S-lay structure.

The first pipe section located in the firing line is lowered to the seabed and subsequently held by the clamp. A second pipe section is positioned in the firing line and connected to the first pipe section. For making the connection it is required that the second pipe section held by the positioning device and the first pipe section held by the clamp are positioned in line with each other.

The interconnected first and second pipe section are lowered to the seabed and the second pipe section is subsequently held by the clamp. The interconnected first and second pipe section form the pipeline suspended from the vessel. By connecting more pipe sections to the pipeline in the same manner, the pipe line is being laid. Also other type of elements, like inline structures etc, may by added to the pipeline.

This means that the pipeline laying operations for laying a pipeline include the above mentioned positioning of a pipe section (or an other type of element) in the firing line, and the connection of the pipe section (or the other type of element) to the pipeline, including all the required operations as for example welding, coating, making up of connectors, attachment of anodes, VIV strakes, and the like.

In use, the pipeline laying vessel is located at sea. Depending on the waves, winds and currents, the vessel floating on the sea water is subjected to specific movements. The vessel may swing about the length axis of the vessel, which is called a roll movement about the roll axis. The vessel may swing about the transverse axis of the vessel, which is called a pitch movement about the pitch axis. The vessel may swing about the height axis of the vessel, which is called a yaw movement about the yaw axis.

These movements of the vessel have a negative effect on the condition of the pipeline suspended from the vessel and held by the clamp, especially when the pipeline is subjected to said movements for a long period of time.

When there is bad weather causing the vessel to move too much to perform pipeline laying operations, the pipeline preferably remains suspended from the vessel and held by the clamp. In said situation there is an even larger negative effect on the condition of the pipeline, because the vessel moves more than under normal weather conditions.

The weather conditions may be that bad, that it is required that the clamp is decoupled from the pipeline and abandoned to the seabed. The pipeline will than stay laying on the seabed until the weather conditions improve. When the weather conditions allows it, the pipeline will be recovered from the seabed and placed in the clamp again to resume the pipeline laying operations. Such an abandonment and recovery operation is very time consuming and results in a loss of production time.

The abandonment operation needs to be initiated before the adverse weather arrives. It therefore happens that a pipeline is abandoned and at a later time it becomes clear the weather conditions are less bad than predicted, and that the abandonment operation was not needed. This causes unnecessary loss of production time.

The object of the invention is to provide an improved or at least an alternative pipeline laying vessel for laying a pipeline on a seabed.

The object is achieved by a pipeline laying vessel for laying a pipeline on a seabed, which pipeline laying vessel comprises a hull, a positioning device for positioning a pipe section in a firing line along which the pipeline is laid, which positioning device is supported by the hull, and a clamp for holding the pipeline suspended from the vessel, wherein the clamp is located in the firing line, and comprises a support device constructed and arranged to allow the clamp to hold the pipeline in a first mode wherein the clamp has a fixed position relative to the positioning device, and in a second mode wherein the clamp is pivotable relative to the positioning device.

For connecting a pipe section to the pipeline, it is required that the pipe section and the pipeline are aligned. In the vessel according the invention, the support device is placed in the first mode when pipeline laying operations are performed. In the first mode, the clamp has a fixed position relative to the positioning device. This allows an accurate alignment of the pipe section and the pipeline.

Movements of the vessel are transferred to the positioning device supported by the hull. In the first mode said movements are transferred to the pipeline because the clamp has a fixed position relative to the positioning device. Said movements have a negative effect on the condition of the pipeline suspended from the vessel.

During the periods that no pipeline laying operations are or can be performed and the pipeline is held by the clamp, the support device is placed in the second mode. In the second mode, the clamp is pivotable relative to the positioning device. Due to this, movements of the vessel are not or at least in reduced form transferred to the pipeline held by the clamp. This means that in the second mode the negative effect of the movements of the vessel is eliminated or at least reduced. As a result of this, the pipeline suspended from the vessel according to the invention is not or at least in a reduced form subjected to the negative effects of the movements of the vessel when no pipeline laying operations are performed.

Therefore, with the pipeline laying vessel according the invention it will be less often required that the weather conditions are that bad that the pipeline needs to be abandoned. This results in a reduced loss of production time due to bad weather conditions.

Due to the fact that in the second mode the clamp is pivotable relative to the positioning device, a small number of parts is moving relative to the rest of the vessel for compensating the movements of the vessel. If for instance the combination of the clamp and the positioning system together were pivotable relative to the rest of the vessel, there would be a far larger number of moving parts. A larger number of moving parts makes a system more complex. In addition, a system with a larger number of moving parts is subjected to an increased wear. The pipeline laying system according the invention has a simple construction.

Furthermore, due to the fact that in the second mode the clamp is pivotable relative to the positioning device, a relatively small mass has to move relative to the rest of the vessel for compensating the movements of the vessel. If for instance the combination of the clamp and the positioning system together were pivotable relative to the rest of the vessel, a far larger mass would have to move. Due to the inertia of mass, the pipeline is subjected to smaller stresses and strains when a smaller mass has to move for compensating the movements of the vessel than in the situations that a larger mass has to move. Therefore, in the pipeline laying vessel according the invention the stresses and strains to which the pipeline held by the clamp are subjected are minimized.

In an embodiment according the invention, the pipeline laying vessel comprises the features according to any of the enclosed claims.

The invention further relates to a pipeline laying system for laying a pipeline along a firing line and from a pipeline laying vessel comprising a hull, which pipeline laying system comprises;
- a positioning device for in use positioning a pipe section in a firing line along which the pipeline is laid, which positioning device is constructed and arranged to in use be supported by the hull, and
- a clamp for in use holding the pipeline suspended from the vessel, wherein the clamp is located in the firing line, and comprises a support device constructed and arranged to allow the clamp to hold the pipeline in a first mode wherein the clamp has a fixed position relative to the positioning device, and in a second mode wherein the clamp is pivotable relative to the positioning device.

In an embodiment according the invention, the pipeline laying system comprises the features according to any of the enclosed claims.

The invention further relates to a pipeline laying vessel for laying a pipeline on a seabed, which pipeline laying vessel comprises;
- a hull,
- a pipeline laying system for laying the pipeline along a firing line, which pipeline laying system is supported by the hull, and wherein the pipeline laying system comprises a clamp for holding the pipeline suspended from the vessel, the clamp is located in the firing line, and comprises a support device constructed and arranged to allow the clamp to hold the pipeline in a first mode wherein the clamp has a fixed position relative to the hull and the rest of the pipeline laying system, and in a second mode wherein the clamp is pivotable relative to the hull and the rest of the pipeline laying system.

The invention further relates to a pipeline laying system for laying a pipeline along a firing line and from a pipeline laying vessel comprising a hull, wherein
- the pipeline laying system is constructed and arranged to in use be supported by the hull and comprises a clamp for holding the pipeline suspended from the vessel,
- the clamp is located in the firing line, and comprises a support device constructed and arranged to allow the clamp to hold the pipeline in a first mode wherein the clamp has a fixed position relative to the rest of the pipeline laying system, and in a second mode wherein the clamp is pivotable relative to the rest of the pipeline laying system.

The invention further relates to a method for laying a pipeline on a seabed with a pipeline laying vessel according to any the invention, wherein the method comprises;
- placing the support device in the first mode when pipeline laying operations are performed, and
- placing the support device in the second mode when no pipeline laying operations are performed.

The invention further relates to a use of a pipeline laying vessel according to the invention.

The invention further relates to a use of a pipeline laying system according to the invention.

Figure 2:
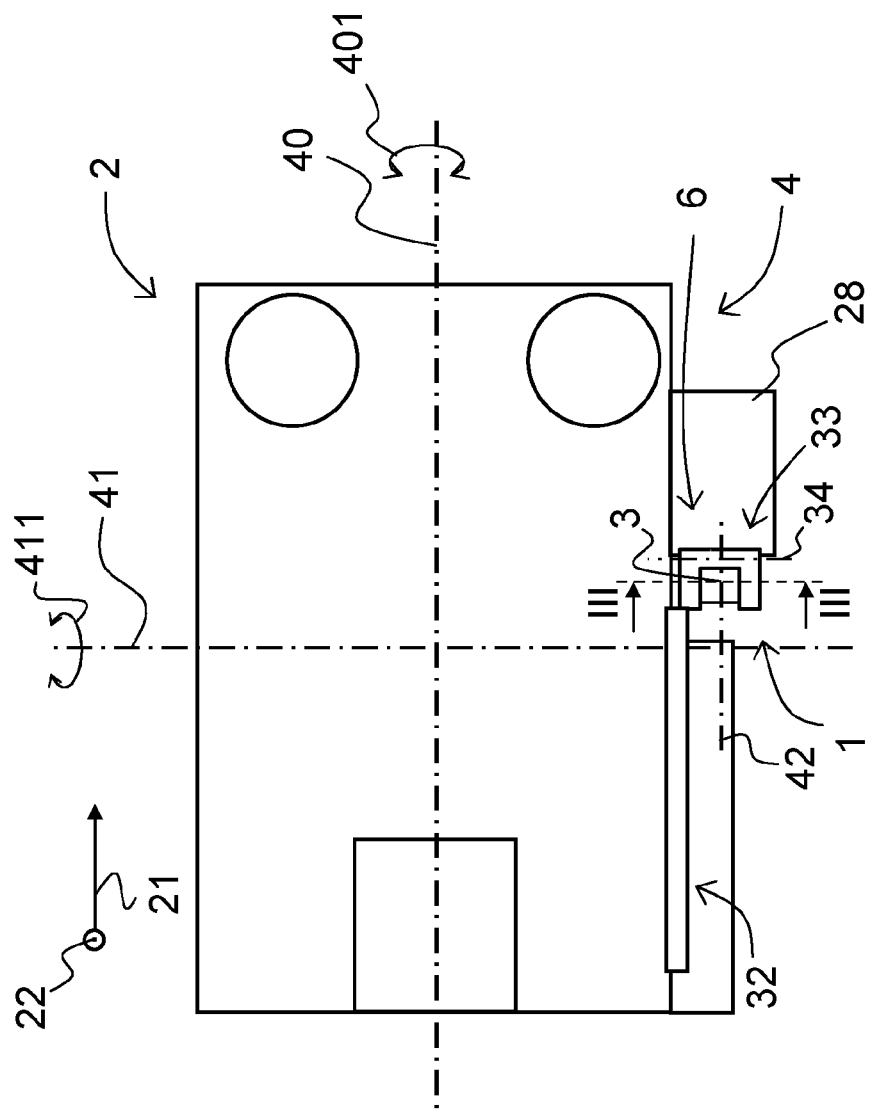
Figure 3:
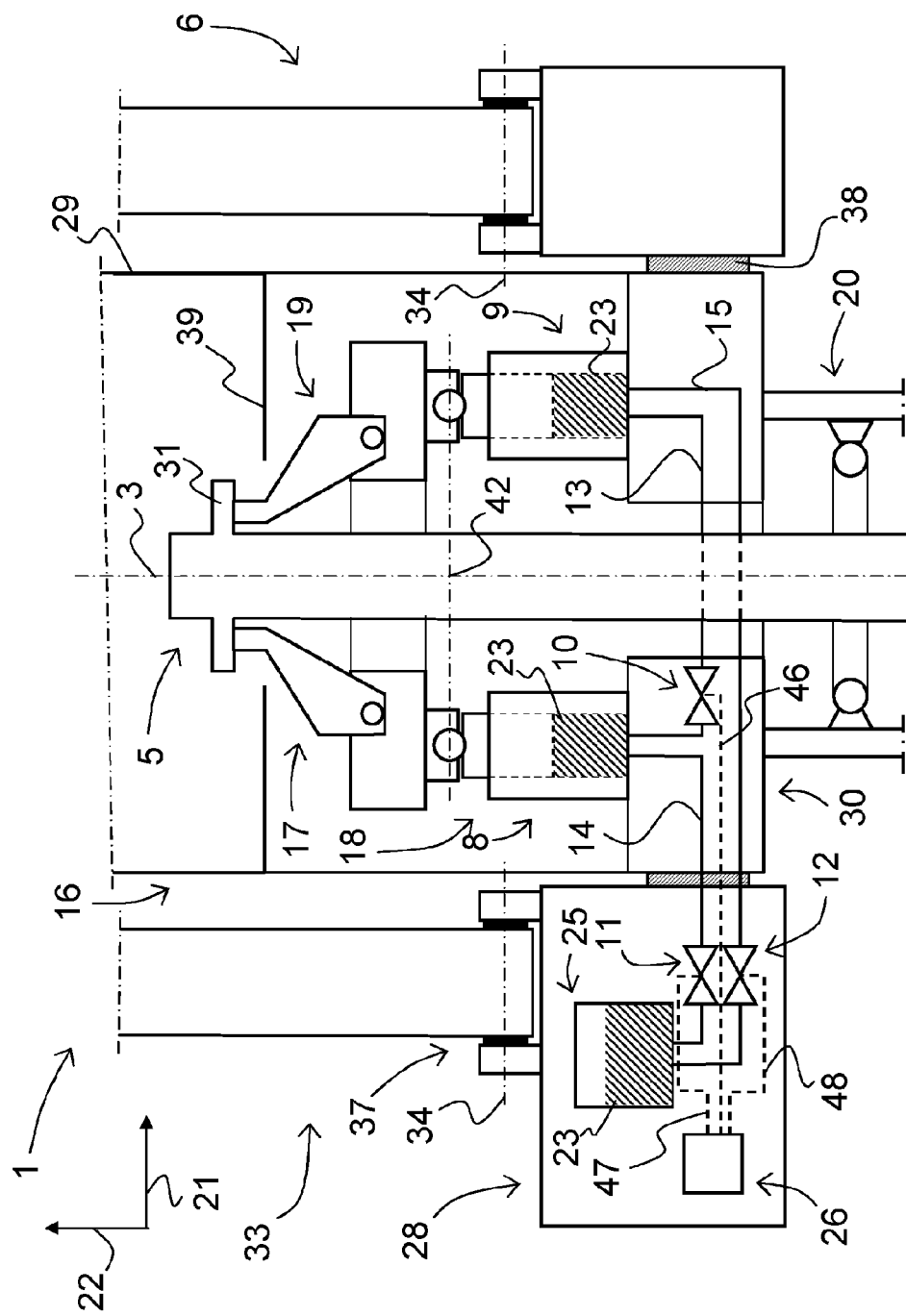
Figure 4:
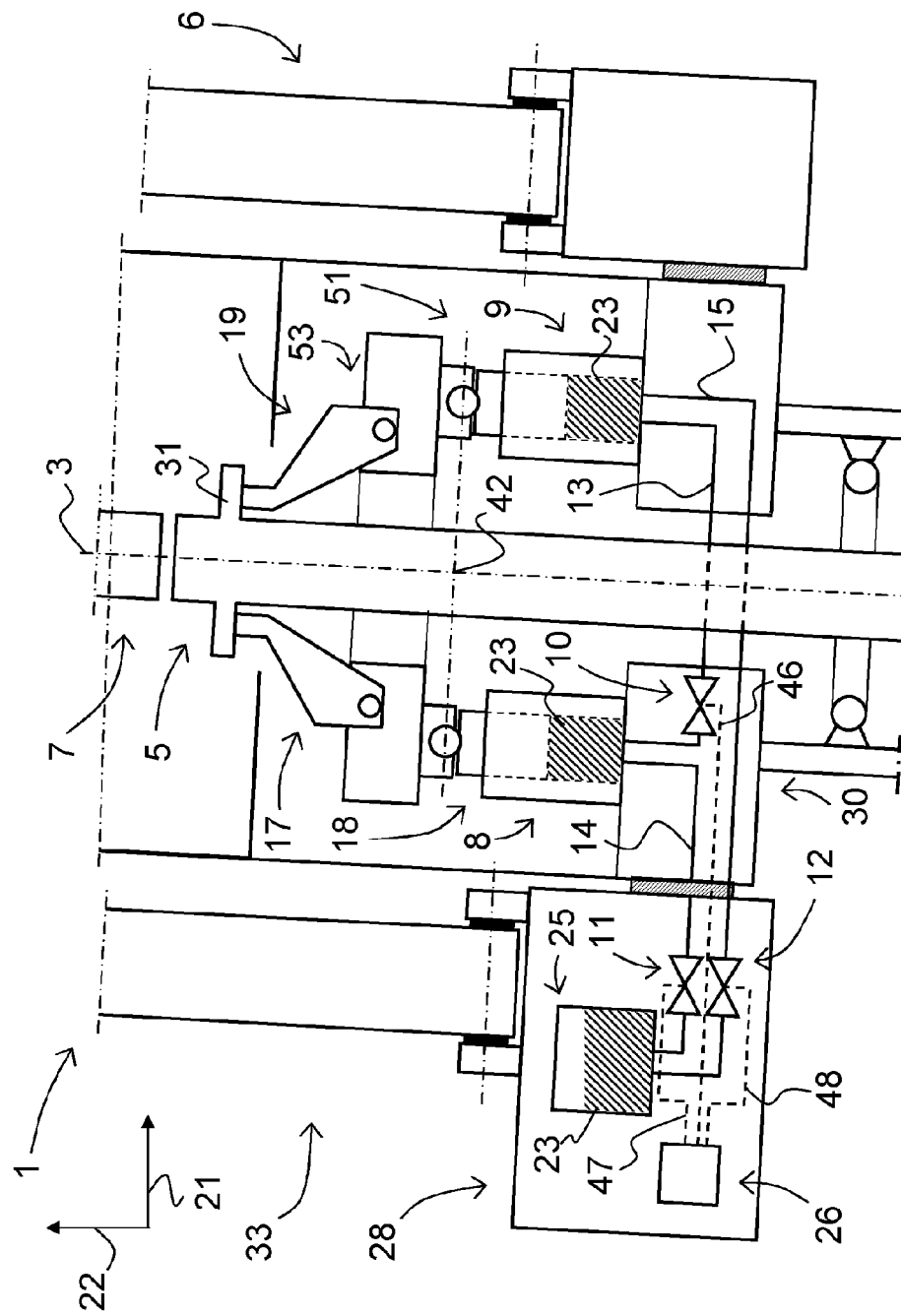
Figure 5:
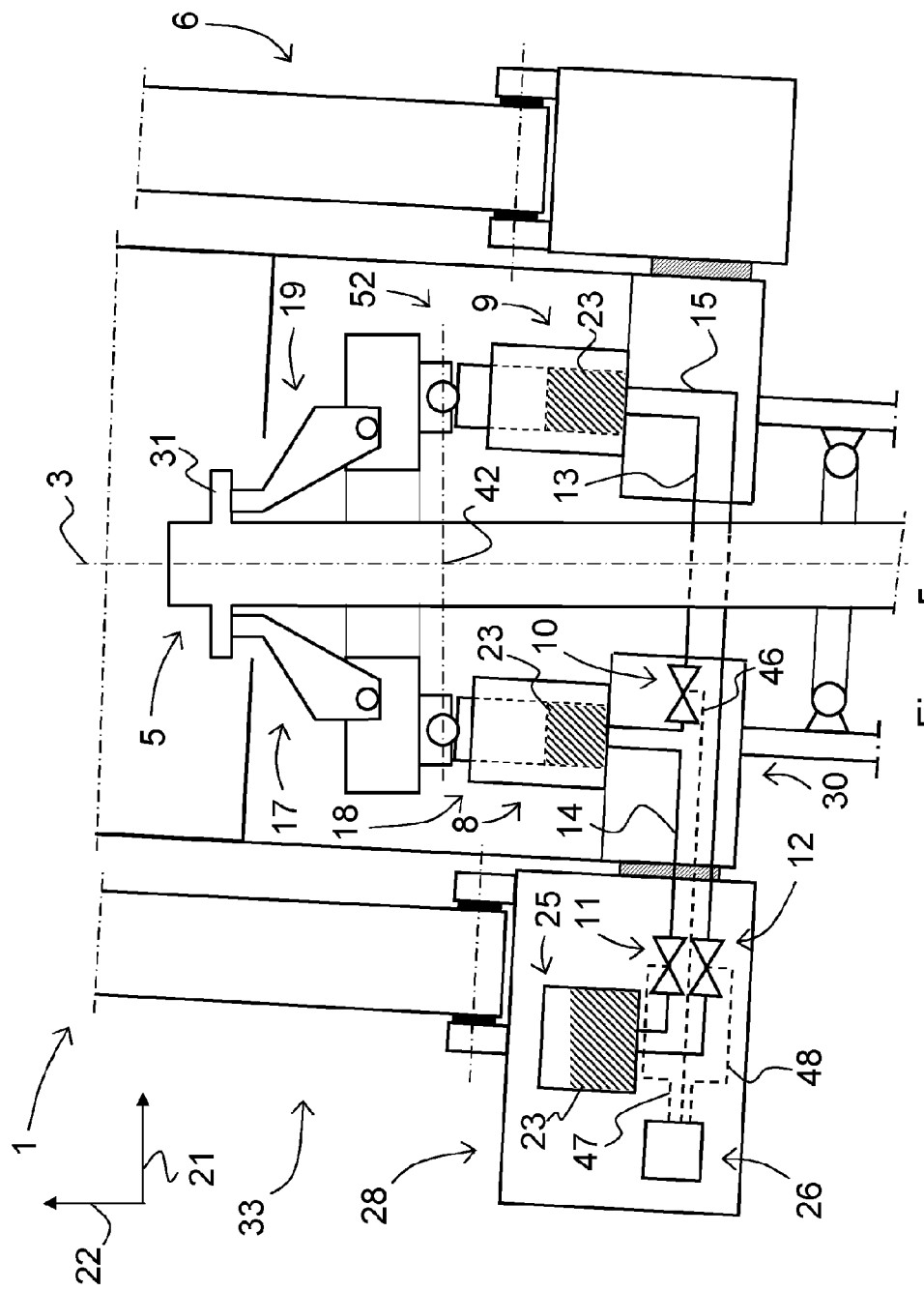
Figure 6:
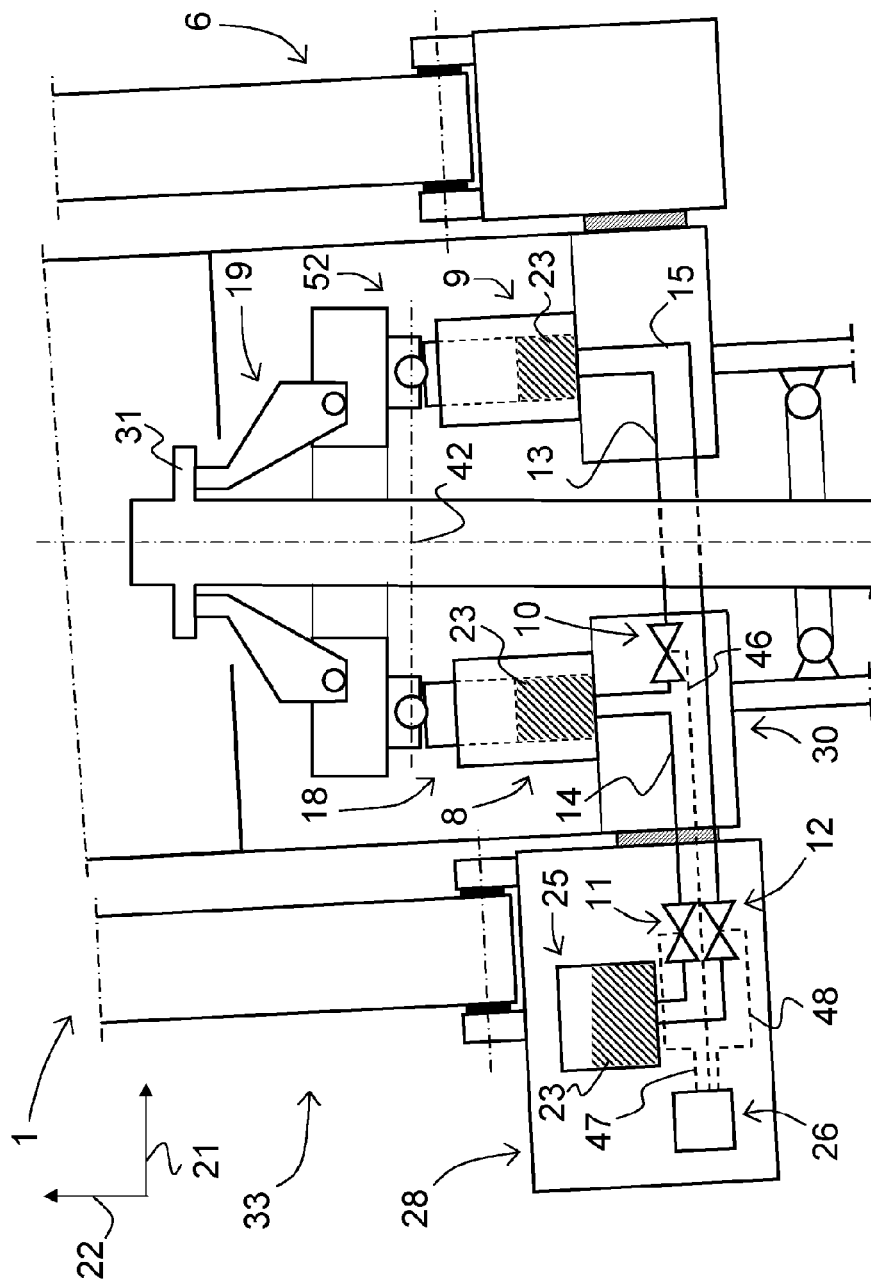
Figure 7:
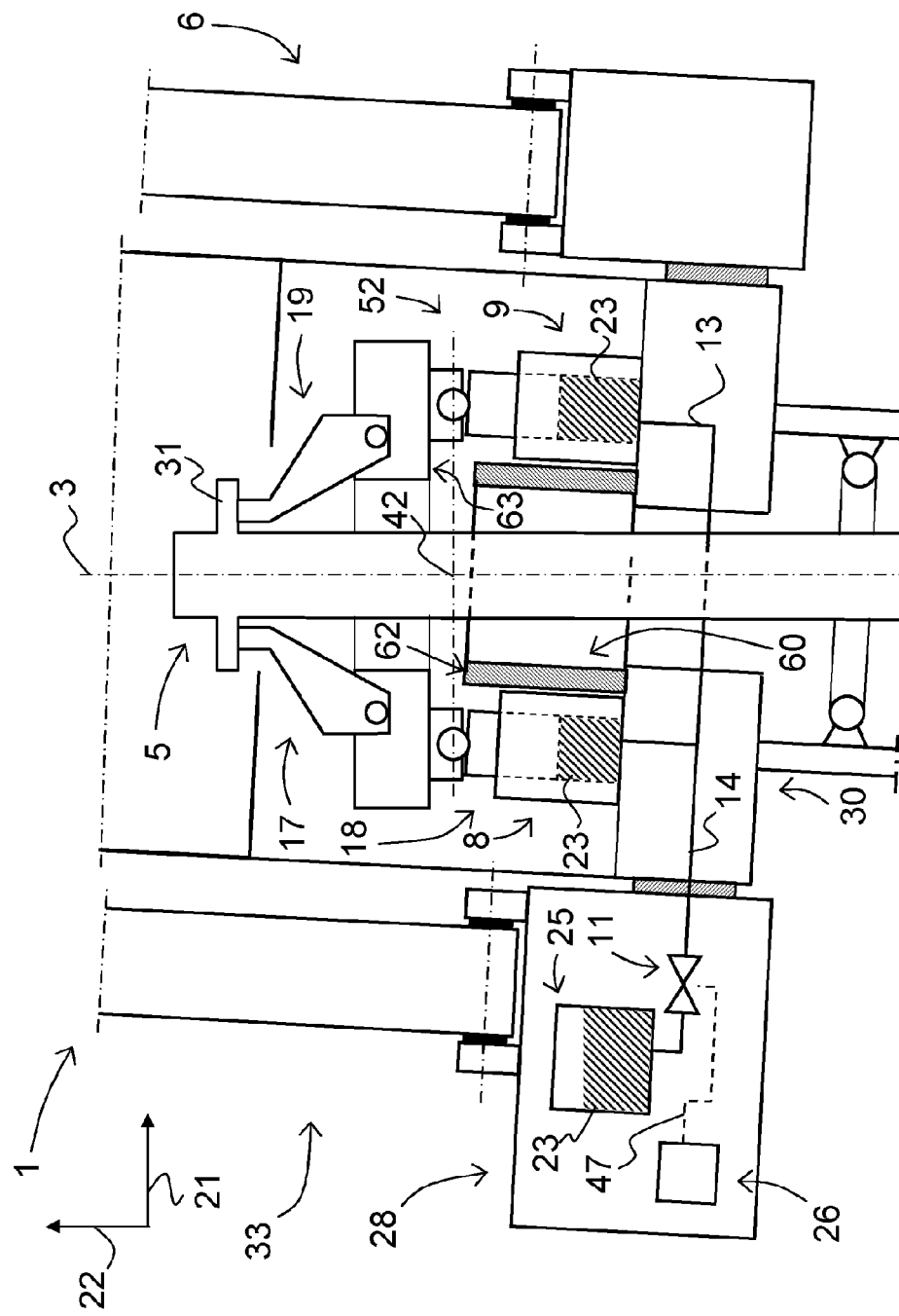
Figure 8:
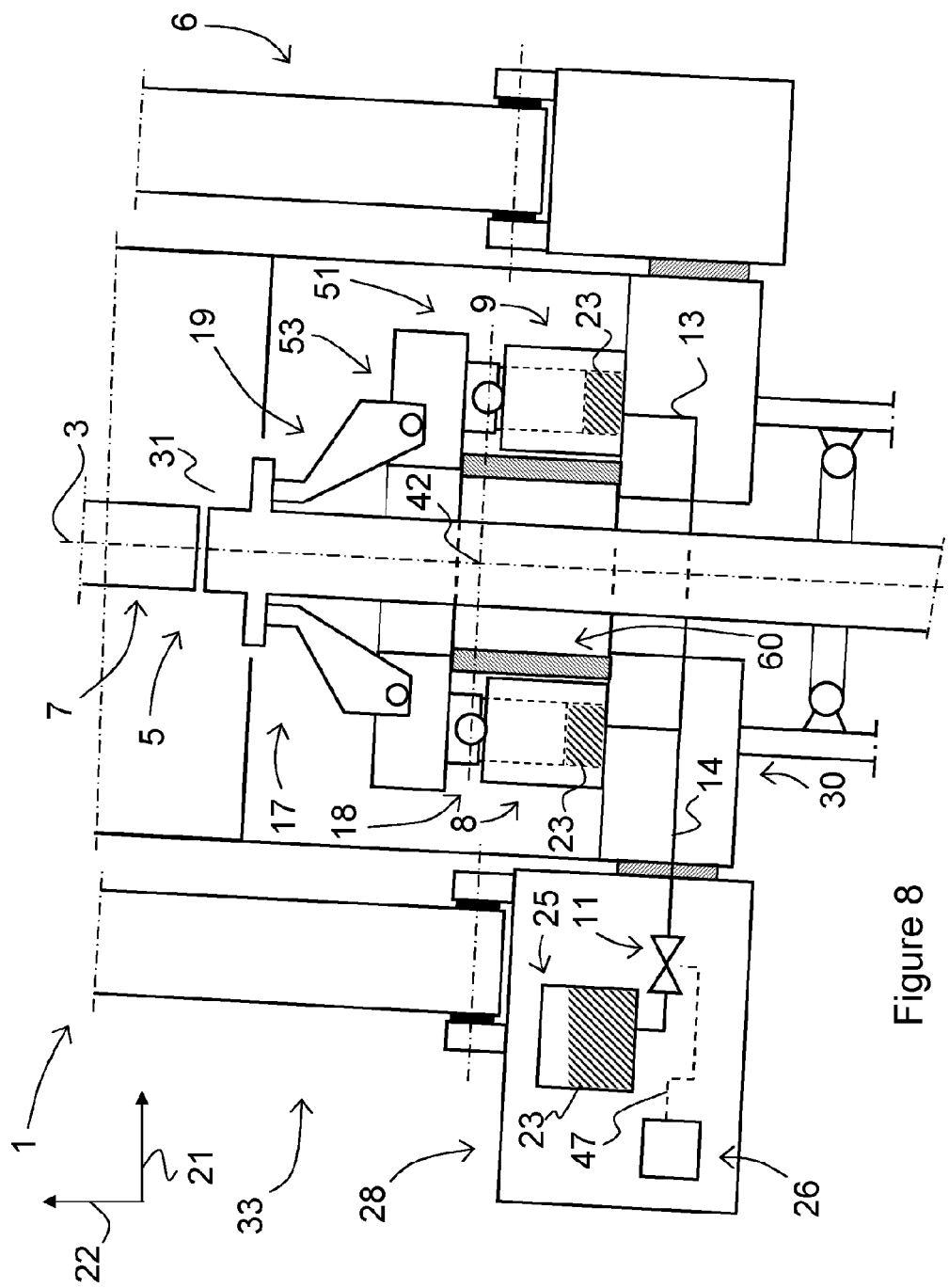
Figure 9:
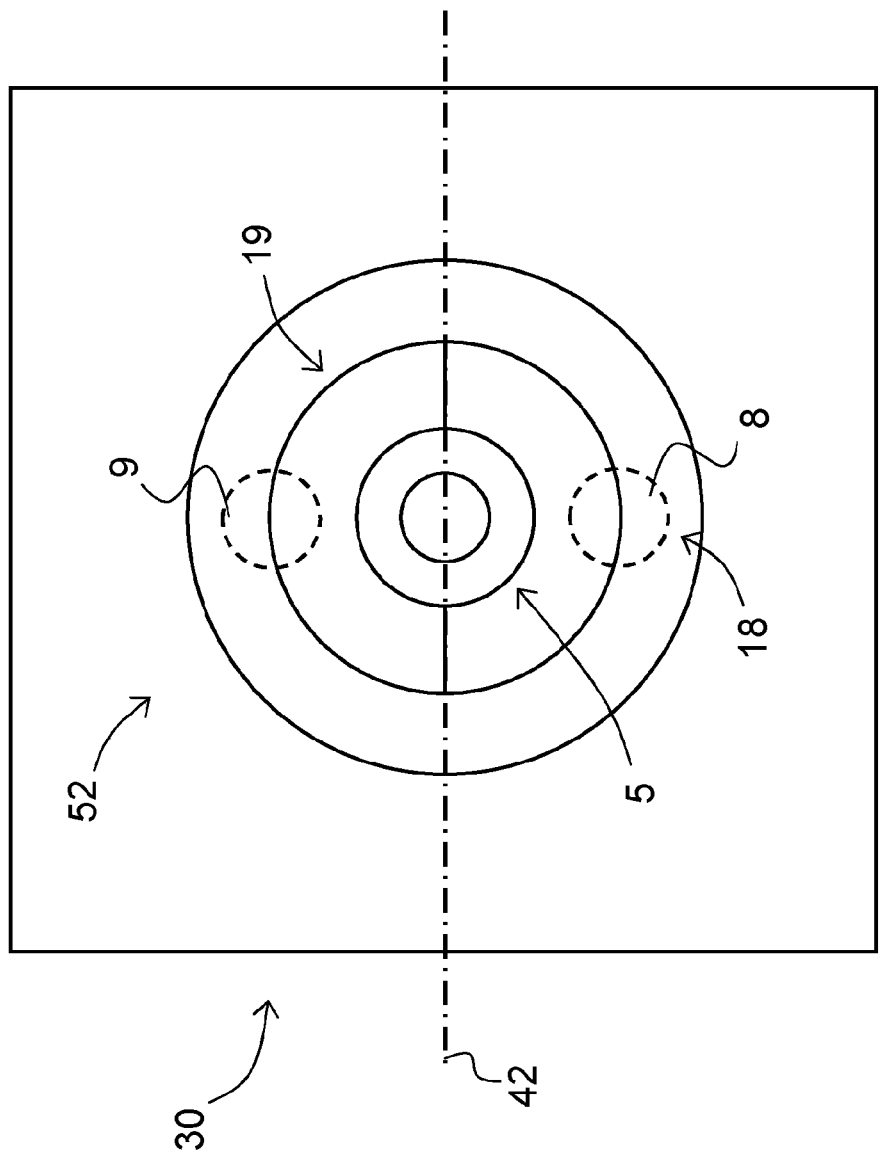
Figure 10:
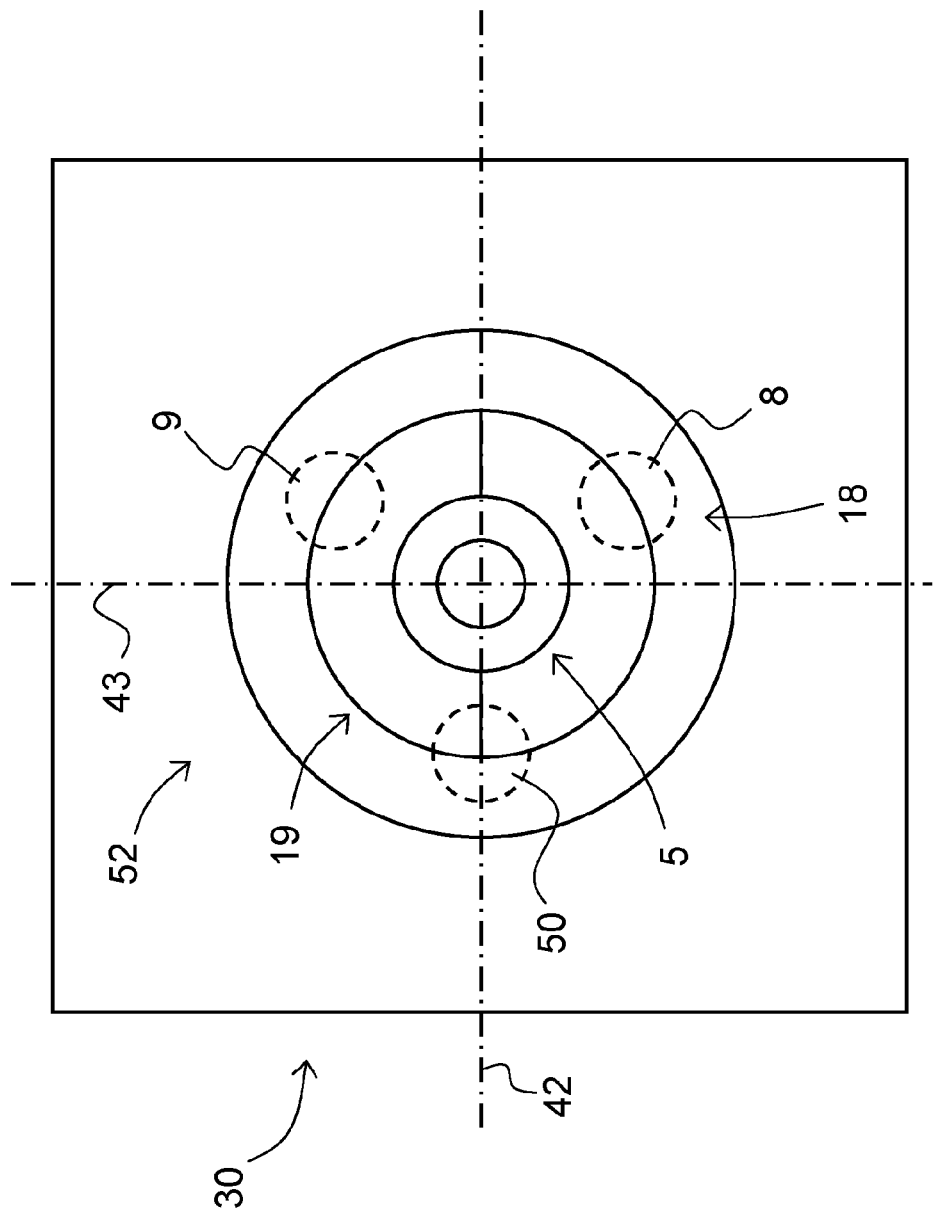
Figure 11:
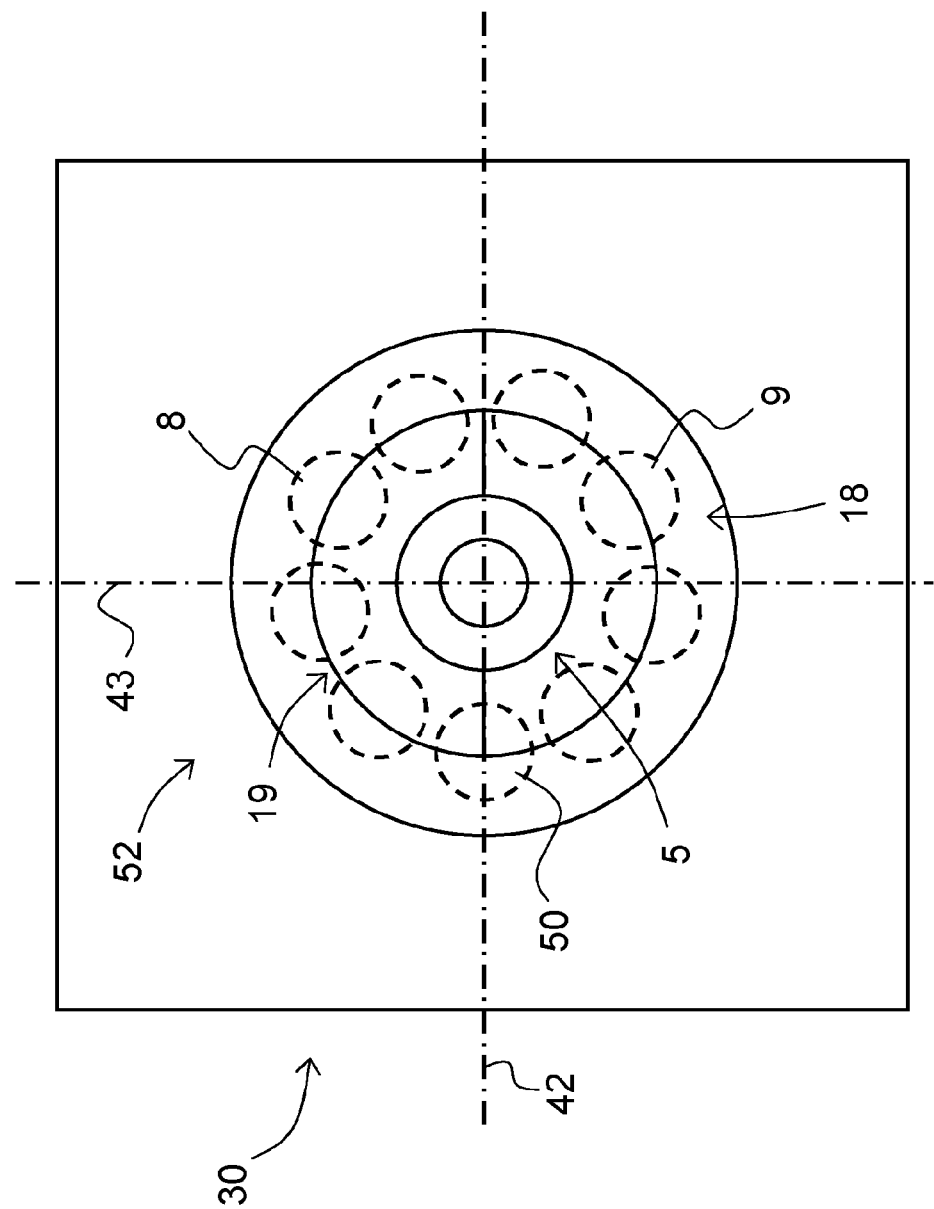
Figure 12:
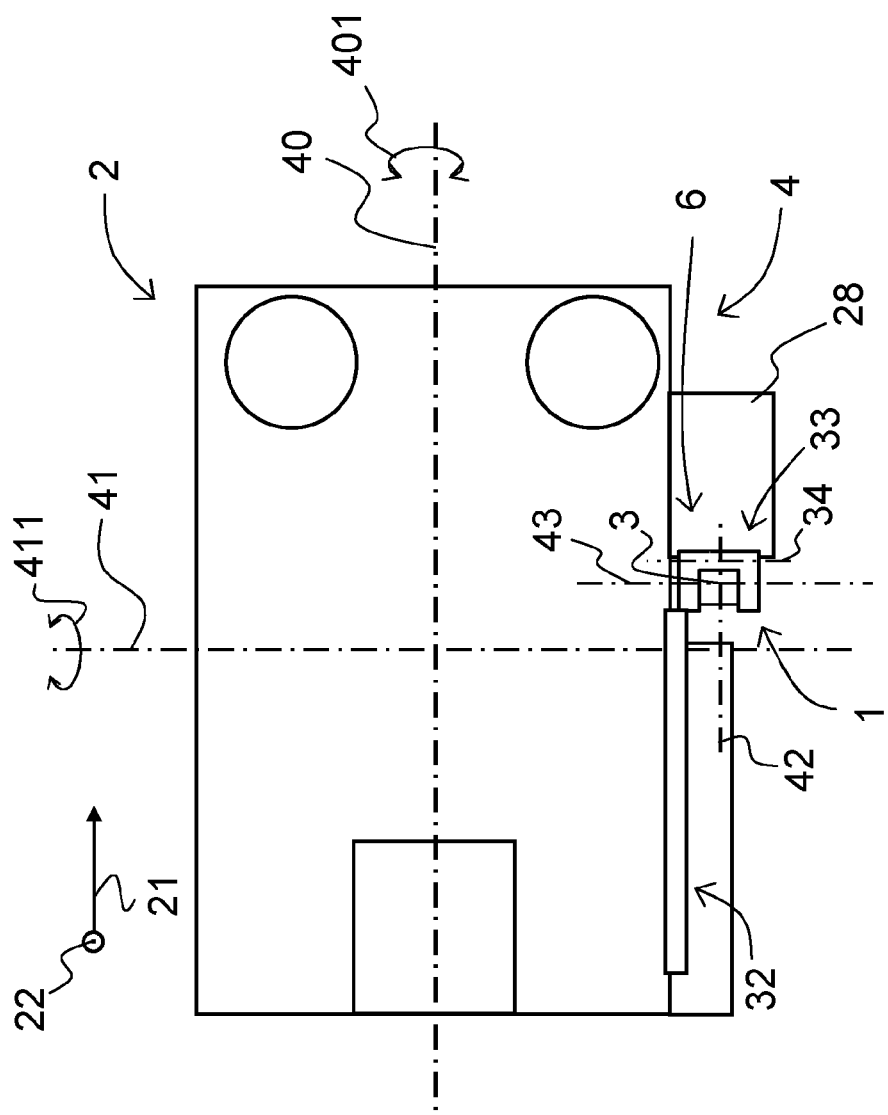

Embodiments of the invention will be described by way of example only, with reference to the accompanying schematic drawings in which corresponding reference symbols indicate corresponding parts, and in which:

FIG. 1 schematically shows a side view of an embodiment of the pipeline laying vessel according to the invention, FIG. 2 schematically shows a top view of the pipeline laying vessel of FIG. 1, FIG. 3 schematically shows an enlarged cross sectional view along line III-III of the pipeline laying system of FIG. 2, FIG. 4 schematically shows the pipeline laying system of FIG. 2 in the situation that pipeline laying operations are performed, the FIGS. 5 and 6 schematically show the pipeline laying system of FIG. 2 in the situation that no pipeline laying operations are performed, the FIGS. 7 and 8 schematically show an alternative embodiment of the pipeline laying system according the invention, FIG. 9 schematically shows a top view of the clamp of the pipeline laying system of FIG. 3, and FIG. 10 schematically shows a top view of an alternative embodiment of a clamp of the pipeline laying system according to the invention, FIG. 11 schematically shows a top view of an alternative embodiment of a clamp of the pipeline laying system according to the invention, FIG. 12 schematically shows a top view of the pipeline laying vessel of the alternative embodiments of the FIGS. 10 and 11.

FIG. 1 shows an embodiment of the pipeline laying vessel according to the invention. The pipeline laying vessel 2 for laying a pipeline 5 on a seabed 35 is floating on the surface of the sea 36. The horizontal direction 21 and vertical direction 22 are indicated by arrows. The vessel 2 comprises a hull 4. A deck 28 forms the upper part of the hull 4. The vessel 2 comprises a positioning device 6 for positioning a pipe section 7 in a firing line 3 along which the pipeline 5 is laid.

The positioning device 6 is supported by the hull 4. More specifically, the positioning device is supported by the deck 28 of the hull 4.

The positioning device 6 comprises a tower 33 for holding the pipe section 7 in the firing line 3, which tower 33 extends upwardly from the deck 28. The positioning device 6 further comprises a loader 32 for moving the pipe section 7 from the deck 28 into the tower 33 by pivoting along arrow 27. The tower 33 and loader 32 are constructed and arranged for J-lay.

In an alternative embodiment, the positioning device 6 may comprise a reel-lay tower where longer pipe sections are fed into the tower from a reel.

In an alternative embodiment, the positioning device 6 may comprise a substantially horizontal extending structure constructed and arranged for S-lay.

The vessel 2 further comprises a clamp 17 for holding the pipeline 5 suspended from the vessel 2. The clamp 17 is located in the firing line 3 and comprises a support device 18 constructed and arranged to allow the clamp 17 to hold the pipeline 5 in a first mode 51 wherein the clamp 17 has a fixed position 53 relative to the positioning device 6 (see FIG. 4), and in a second mode 52 wherein the clamp 17 is pivotable relative to the positioning device 6 (see FIGS. 5 and 6).

The positioning device 6 and the clamp 17 are part of the pipeline laying system 1 provided on the pipeline laying vessel 2. A stinger 20 is connected to a lower part of the clamp 17. A workstation 16 with walls 29 is provided on the vessel 2. The clamp 17 is located under the workstation 16. A work floor 39 is provided to create access to the top of the pipeline 5. The clamp shown in FIG. 1 is often referred to as hang-off clamp.

In the first mode 51, the clamp 17 has a fixed position 53 relative to the positioning device 6. This allows an accurate and stable alignment of the pipe section 7 and the pipeline 5, which is required for connecting the pipe section 7 held by the positioning device 6 to the pipeline 5 held by the clamp 17. In the first mode 51, movements of the vessel 2 are transferred to pipeline 5 held by the clamp 17. This results in stresses and strains in the pipeline 5, which have a negative effect on the condition of the pipeline 5.

When no pipeline laying operations are performed on the vessel 2, the support device 18 is placed in the second mode 52. In the second mode 52, the clamp 17 is pivotable relative to the positioning device 6. Due to this, movements of the vessel 2 are not or at least in reduced form transferred to the pipeline 5 held by the clamp 17. This way, the pipeline 5 is subjected to no or at least lesser stresses and strains. As a result of this, the condition of the pipeline 5 is not or at least less affected.

With the pipeline laying vessel 2 according the invention it will be less often required that the weather condition are that bad that the pipeline 5 needs to be abandoned. This results in a reduced loss of production time due to bad weather conditions.

Due to the fact that in the second mode 52 the clamp 17 is pivotable relative to the positioning device 6 (in the shown situation, the tower 33 and the loader 32), a small number of parts is moving relative to the rest of the vessel 22 for compensating the movements of the vessel 22. If for instance the clamp 17 and the positioning system 6 (tower 33 and loader 32) together were pivotable relative to the rest of the vessel 2, there would be a far larger number of moving parts. A larger number of moving parts makes a system more complex. In addition, a system with a larger number of moving parts is subjected to an increased wear.

Furthermore, due to the fact that in the second mode 52 the clamp 17 is pivotable relative to the positioning device 6 (tower 33 and loader 32), a relatively small mass has to move relative to the rest of the vessel 2 for compensating the movements of the vessel 2. If for instance the clamp 17 and the positioning system 6 (tower 33 and loader 32) together were pivotable relative to the rest of the vessel 2, a far larger mass would have to move. Due to the inertia of mass, the pipeline 5 is subjected to smaller stresses and strains when a smaller mass has to move for compensating the movements of the vessel 2 than in the situations that a larger mass has to move. Therefore, in the pipeline laying vessel 2 according the invention the stresses and strains to which the pipeline 5 held by the clamp are subjected are minimized.

With a light mass to be moved, even the pipe line 5 itself can move the clamp 17. In that case no active motion compensation system will be needed as is the case when the clamp 17 and the positioning system 6 (tower 33 and loader 32) would be pivotable relative to the rest of the vessel 2.

FIG. 2 shows a top view of the pipeline laying vessel of FIG. 1. The roll axis 40 together with the roll movement 401 and the pitch axis 41 together with the pitch movement 411 are indicated. The clamp 17 is in the second mode 52 pivotable about a first pivot axis 42. The first pivot axis 42 extends substantially parallel to the roll axis 40 of the vessel 2. The tower 33 can be moved about the pivot axis 34 relative to the hull 4 to determine the orientation of the firing line 3 along which the pipeline 5 is laid. The angle which the firing line 3 makes with the horizontal strongly depends on the water depth in which the pipeline 5 is laid. In very deep waters, said angle will be around 90°. In more shallow waters, said angle will be smaller.

FIG. 3 shows an enlarged cross sectional view along line III-III of the pipeline laying system of FIG. 2. The tower 33 is supported by the deck 28 via two tower hinges 37 allowing the tower 33 to pivot about the tower pivot axis 34 in order to position the firing line 3. The clamp 17 is located at the underside of the workstation 16. A small part of the clamp 17 is located inside the workstation 16.

The clamp 17 comprises a base structure 30 which is supported by the hull 4, more specifically by the deck 28. In an alternative embodiment, the base structure 30 may (also) be supported by the positioning device 6, more specifically by the tower 33. The base structure 30 is supported via a slide support 38 allowing the clamp 17 to be moved into an inoperative position at a distance of the firing line 3. This is for example used to allow the passage of a bulky item, such as a inline structure. The clamp 17 holding the pipeline 5 is located in an operative position in the firing line 3.

The clamp 17 comprises a clamp unit 19 for clamping the pipeline. The pipeline 5 comprises a collar 31 and the clamp unit 19 is a collar clamp unit for engaging a collar 31. In an alternative embodiment, the clamp unit 19 may be a friction clamp unit comprising friction elements engaging the pipeline 5.

The clamp unit 19 is attached to the base structure 30 via the support device 18. The support device 18 is constructed and arranged to allow the clamp unit 19 to clamp the pipeline 5 in the first mode 51 wherein the clamp unit 19 has a fixed position 53 relative to the positioning device 6 and the base structure 30 and in the second mode 52 wherein the clamp unit 19 is pivotable relative to the positioning device 6 and the base structure 30 (see FIG. 4-6).

Due to the fact that in the second mode 52 the clamp unit 19 is pivotable relative to the positioning device 6 and the base structure 30, a small mass is moving relative to the rest of the vessel 2 for compensating the movements of the vessel 2.

Furthermore, due to the fact that in the second mode 52 the clamp unit 19 is pivotable relative to the positioning device 6 and the base structure 30, a small number of parts moving relative to the rest of the vessel 2 for compensating the movements of the vessel 2.

The support device 18 comprises a first hydraulic cylinder 8 and a second hydraulic cylinder 9, which both support the clamp unit. In an alternative embodiment, the hydraulic cylinders 8, 9 may support a different part and/or additional parts of the clamp 17 or the entire clamp 17.

The first and second hydraulic cylinders 8, 9 are interconnected by a first hydraulic fluid connection 13. In the first mode 51 the first hydraulic fluid connection 13 is closed by closing the first valve 10 to prevent that hydraulic fluid 23 flows from one of the first and second hydraulic cylinder 8, 9 to the other of the first and second hydraulic cylinder 8, 9. In the second mode 52 the first hydraulic fluid connection 13 is open by opening the first valve 10 to allow that hydraulic fluid 23 flows from one of the first and second hydraulic cylinder 8, 9 to the other of the first and second hydraulic cylinder 8, 9.

A control unit 26 is connected to the first valve 10 via a first communication line 46 for controlling the opening and closing of the first valve 10.

The first hydraulic cylinders 8 is connected to a hydraulic fluid supply 25 via a second hydraulic fluid connection 14 comprising a second valve 11 for opening and closing the second hydraulic fluid connection 14. The second hydraulic cylinders 9 is connected to the hydraulic fluid supply 25 via a third hydraulic fluid connection 15 comprising a third valve 12 for opening and closing the third hydraulic fluid connection 15.

The control unit 26 is connected to the second valve 11 via a second communication line 47 and to the third valve 12 via a third communication line 48 for controlling the opening and closing of the second and third valve 11, 12.

In an alternative embodiment a hinge may be used to allow the clamp 17 to pivot about the first pivot axis 42 in stead of hydraulic cylinders 8, 9.

In an alternative embodiment a spring element may be used to allow the clamp 17 to pivot about the first pivot axis 42 in stead of hydraulic cylinders 8, 9.

FIG. 4 shows the pipeline laying system of FIG. 2 in the situation that pipeline laying operations are performed. The support device 30 is placed in the first mode 51. The clamp unit 3 is located in a fixed position 53 relative to the positioning device 6 and the base structure 30. A pipe section 7 is positioned in line with the pipeline 5 for connection thereto. In the situation shown, the vessel 2 is subjected to a clockwise roll movement 401 about the roll axis 40. The positioning device 6, the base structure 30 and the clamp unit 19 are moved such that they are positioned under an angle relative to the horizontal 21.

FIGS. 5 and 6 schematically show the pipeline laying system of FIG. 2 in the situation that no pipeline laying operations are performed. The support device 30 is placed in the second mode 52. The clamp unit 3 is pivotable relative to the positioning device 6 and the base structure 30. In the situation shown in FIG. 5, the vessel 2 is subjected to a clockwise roll movement 401 about the roll axis 40. The positioning device 6 and the base structure 30 are moved such that they are positioned under an angle relative to the horizontal 21. The clamp unit 19 holding the pipeline is pivoted about the first pivot axis 42 relative to the positioning device 6 and the base structure 30 and remains in a substantially horizontal position. In the situation shown in FIG. 6, the vessel 2 is subjected to a counter clockwise roll movement 401 about the roll axis 40. The positioning device 6 and the base structure 30 are moved such that they are positioned under an angle relative to the horizontal 21. The clamp unit 19 holding the pipeline is pivoted about the first pivot axis 42 relative to the positioning device 6 and the base structure 30 and remains in a substantially horizontal position.

The FIGS. 7 and 8 show an alternative embodiment of the pipeline laying system according the invention. The support device 18 comprises a rigid support member 60. The rigid support member 60 comprises a first support surface 62. The clamp unit 19 comprises a second support surface 63. The two hydraulic cylinders 8, 9 are interconnected by an open hydraulic fluid connection 13. The open hydraulic fluid connection 13 is connected to the hydraulic fluid supply 25 via a controllable hydraulic fluid connection 14. A valve 11 is provided to open of close the controllable hydraulic fluid connection 14. The opening and closing of said valve 11 is controlled by control unit 26 which is connected to said valve 11 via a communication line 47. The hydraulic fluid supply 25 and the control unit 26 are constructed and arranged to tap hydraulic fluid 23 from the hydraulic cylinders 8, 9 and to add hydraulic fluid 23 to the hydraulic cylinders 8, 9. Other configurations to tap and add hydraulic fluid are possible.

In FIG. 7, the support device 18 is placed in the second mode 52. Hydraulic fluid 23 is added to the hydraulic cylinders 8, 9 to position the clamp unit 19 at a distance from the rigid support member 60 to allow the clamp unit 19 to pivot relative to the positioning device 6 and the base structure 30.

In FIG. 8, the support device 18 is placed in the first mode 51. Hydraulic fluid 23 is tapped from the hydraulic cylinders 8, 9 to lower the clamp unit 19 on the rigid support 60 such that the clamp unit 19 has a fixed position 53 relative to the positioning device 6 and the base structure 30. The clamp unit 19 is in the first mode 51 supported by the hull 4, more specifically the deck 28 of the hull 4, via the rigid support member 60. In the first mode 51 the second support surface 63 is positioned on the first support surface 62. This way a fixed and stable position of the clamp unit 19 is ensured during pipeline laying operations.

The rigid support member 60 may be connected to or form an integrated part of the base structure 30 or the positioning device 6.

FIG. 9 shows a top view of the clamp of the pipeline laying system of FIG. 3. The first and second hydraulic cylinder 8, 9 are located at a distance from each other and the first pivot axis 42 extends between the first and second hydraulic cylinder 8, 9.

FIG. 10 shows a top view of an alternative embodiment of a clamp of the pipeline laying system according to the invention. The support device comprises a first, second and third hydraulic cylinders 8, 9, 50 located at a distance from each other. The support device 18 is constructed and arranged to compensate for any roll movement and pitch movement of the vessel 2. The support device 18 in the second mode 52 in fact comprises a second pivot axis 43 extending substantially parallel to the pitch axis 41 of the vessel 2.

In an alternative embodiment, hinges may be used in stead of hydraulic cylinders 8, 9, to provide a cardanic construction to allow the clamp 17 to pivot about the first pivot axis 42 and the second pivot axis 43.

In an alternative embodiment spring elements may be used in stead of hydraulic cylinders 8, 9 to allow the clamp 17 to pivot about the first pivot axis 42 and the second pivot axis 43.

FIG. 11 schematically shows a top view of an alternative embodiment of a clamp of the pipeline laying system according to the invention. The support device 18 comprises nine hydraulic cylinders 8, 9, 50 located at distances from each other. The support device 18 is constructed and arranged to compensate for any roll movement and pitch movement of the vessel 2.

In the embodiments of FIGS. 10 and 11, the hydraulic cylinders 8, 9, 50 are positioned along a circle.

FIG. 12 schematically shows a top view of the pipeline laying vessel of the alternative embodiments of the FIGS. 10 and 11. The roll axis 40 together with the roll movement 401 and the pitch axis 41 together with the pitch movement 411 are indicated. The clamp 17 is in the second mode 52 pivotable about the first pivot axis 42 and the second second pivot axis 43. The first pivot axis 42 extends substantially parallel to the roll axis 40 of the vessel 2. The second pivot axis 43 extends substantially parallel to the pitch axis 41 of the vessel 2.

The following clauses are offered as a disclosure of further embodiments of the pipeline laying vessel, pipeline laying system, method and use according to the invention.

1. Pipeline laying vessel for laying a pipeline on a seabed, which pipeline laying vessel comprises;
 a hull,
 a positioning device for positioning a pipe section in a firing line along which the pipeline is laid, which positioning device is supported by the hull, and
 a clamp for holding the pipeline suspended from the vessel, wherein
the clamp is located in the firing line, and comprises a support device constructed and arranged to allow the clamp to hold the pipeline in a first mode wherein the clamp has a fixed position relative to the positioning device, and in a second mode wherein the clamp is pivotable relative to the positioning device.

2. Pipeline laying vessel according to clause 1, wherein the clamp in the second mode is pivotable about a first pivot axis.

3. Pipeline laying vessel according to clause 2, wherein the first pivot axis extends substantially parallel to a roll axis of the vessel.

4. Pipeline laying vessel according to any of the preceding clauses, wherein the clamp in the second mode is pivotable about a second pivot axis.

5. Pipeline laying vessel according to clause 4, wherein the second pivot axis extends substantially parallel to a pitch axis of the vessel.

6. Pipeline laying vessel according to clause 4 or 5, wherein the first pivot axis and the second pivot axis extend transverse, preferably substantially perpendicular, to each other.

7. Pipeline laying vessel according to any of the preceding clauses, wherein the clamp in the second mode is pivotable over an angle of at least 2 degrees relative to the horizontal.

8. Pipeline laying vessel according to any of the preceding clauses, wherein the clamp in the second mode is pivotable over an angle of at least 5 degrees relative to the horizontal.

9. Pipeline laying vessel according to any of the preceding clauses, wherein the support device is constructed and arranged to switch from the first mode to the second mode, and vice versa.

10. Pipeline laying vessel according to any of the preceding clauses, wherein the support device comprises a control unit constructed and arranged to control switching from the first mode to the second mode, and vice versa.

11. Pipeline laying vessel according to any of the preceding clauses, wherein the support device comprises a rigid support member and at least part of the clamp is in the first mode supported by the hull or the positioning device via the rigid support member.

12. Pipeline laying vessel according to clause 11, wherein the rigid support member comprises a first support surface, the clamp comprises a second support surface and in the first mode the second support surface is positioned on the first support surface.

13. Pipeline laying vessel according to clause 12, wherein in the second mode the first support surface is positioned at a distance from the second support surface to allow the clamp to pivot relative to the positioning device.

14. Pipeline laying vessel according to any of the preceding clauses, wherein the support device comprises at least one spring element supporting at least part of the clamp.

15. Pipeline laying vessel according to any of the preceding clauses, wherein the support device comprises at least one hinge supporting at least part of the clamp.

16. Pipeline laying vessel according to any of the preceding clauses, wherein the support device comprises two hydraulic cylinders comprising hydraulic fluid and supporting at least part of the clamp.

17. Pipeline laying vessel according to any of the clauses 1-15, wherein the support device comprises at least three hydraulic cylinders comprising hydraulic fluid and supporting at least part of the clamp.

18. Pipeline laying vessel according to any of the preceding clauses, wherein in the first mode a flow of hydraulic fluid in and out the hydraulic cylinders is blocked to support the clamp in a fixed position relative to the positioning device.

19. Pipeline laying vessel according to any of the preceding clauses, wherein in the second mode a flow of hydraulic fluid in and out the hydraulic cylinders is allowed to support the clamp such that the clamp is pivotable relative to the positioning device.

20. Pipeline laying vessel according to any of the preceding clauses, wherein in the second mode a flow of hydraulic fluid between the hydraulic cylinders is allowed to support the clamp such that the clamp is pivotable relative to the positioning device.

21. Pipeline laying vessel according to any of the clauses 11-17, wherein
  in the first mode hydraulic fluid is tapped from the hydraulic cylinders to position the clamp on the rigid support in a fixed position relative to the positioning device, and
  in the second mode hydraulic fluid is added to the hydraulic cylinders to position the clamp at a distance from the rigid support and to allow the clamp to pivot relative to the positioning device.

22. Pipeline laying vessel according to any of the preceding clauses, wherein
  the clamp comprises a base structure supported by the hull and/or the positioning device,
  the clamp comprises a clamp unit for clamping the pipeline,
  the clamp unit is attached to the base structure, and
  the support device is constructed and arranged to allow the clamp unit to clamp the pipeline in the first mode wherein the clamp unit has a fixed position relative to the positioning device and the base structure and in the second mode wherein the clamp unit is pivotable relative to the positioning device and the base structure.

23. Pipeline laying vessel according to any of the clauses 1-20, 22, wherein
  the support device comprises a first hydraulic cylinder and a second hydraulic cylinder which both support at least part of the clamp,
  the first and second hydraulic cylinders are interconnected by a hydraulic fluid connection,
  in the first mode the hydraulic fluid connection is closed to prevent that hydraulic fluid flows from one of the first and second hydraulic cylinder to the other of the first and second hydraulic cylinder, and
  in the second mode the hydraulic fluid connection is open to allow that hydraulic fluid flows from one of the first and second hydraulic cylinder to the other of the first and second hydraulic cylinder.

24. Pipeline laying vessel according to any of the clauses 1-20, 22, wherein
  the support device comprises a first hydraulic cylinder, a second hydraulic cylinder, and a third hydraulic cylinder supporting at least part of the clamp,
  the first, second and third hydraulic cylinders are interconnected by a hydraulic fluid connection,
  in the first mode the hydraulic fluid connection is closed to prevent that hydraulic fluid flows from one of the first, second and third hydraulic cylinder to an other of the first, second and third hydraulic cylinder, and
  in the second mode the hydraulic fluid connection is open allow that hydraulic fluid flows from one of the first, second and third hydraulic cylinder to an other of the first, second and third hydraulic cylinder.

25. Pipeline laying vessel according to any of the preceding clauses, wherein the positioning device comprises a tower which in use extends upwardly from the hull.

26. Pipeline laying vessel according to clause 25, wherein the clamp is located near a lower part of the tower.

27. Pipeline laying vessel according to any of the clauses 1-24, wherein the positioning device comprises a substantially horizontal extending structure.

28. Pipeline laying vessel according to any of the preceding clauses, wherein the clamp is a collar clamp or a friction clamp or a tensioner.

29. Pipeline laying system for laying a pipeline along a firing line and from a pipeline laying vessel comprising a hull, which pipeline laying system comprises;
   a positioning device for in use positioning a pipe section in a firing line along which the pipeline is laid, which positioning device is constructed and arranged to in use be supported by the hull, and
   a clamp for in use holding the pipeline suspended from the vessel, wherein the clamp is located in the firing line, and comprises a support device constructed and arranged to allow the clamp to hold the pipeline in a first mode wherein the clamp has a fixed position relative to the positioning device, and in a second mode wherein the clamp is pivotable relative to the positioning device.

30. Pipeline laying system according to clause 29, comprising the features of any of the clauses 1-28.

31. Pipeline laying vessel for laying a pipeline on a seabed, which pipeline laying vessel comprises;
   a hull,
   a pipeline laying system for laying the pipeline along a firing line, which pipeline laying system is supported by the hull, and comprises a clamp for holding the pipeline suspended from the vessel, the clamp is located in the firing line, and comprises a support device constructed and arranged to allow the clamp to hold the pipeline in a first mode wherein the clamp has a fixed position relative to the rest of the pipeline laying system, and in a second mode wherein the clamp is pivotable relative to the rest of the pipeline laying system.

32. Pipeline laying vessel according to clause 31, wherein the pipeline laying system comprises a positioning device for positioning a pipe section in the firing line.

33. Pipeline laying vessel according to clause 31 or 32, wherein the pipeline laying vessel comprises the features of any of the clauses 1-28.

34. Pipeline laying system for laying a pipeline along a firing line and from a pipeline laying vessel comprising a hull, wherein
   the pipeline laying system is constructed and arranged to in use be supported by the hull and comprises a clamp for holding the pipeline suspended from the vessel,
   the clamp is located in the firing line, and comprises a support device constructed and arranged to allow the clamp to hold the pipeline in a first mode wherein the clamp has a fixed position relative to the rest of the pipeline laying system, and in a second mode wherein the clamp is pivotable relative to the rest of the pipeline laying system.

35. Pipeline laying system according to clause 34, wherein the pipeline laying system comprises a positioning device for positioning a pipe section in the firing line.

36. Pipeline laying system according to clause 34 or 35, comprising the features of any of the clauses 1-28.

37. Method for laying a pipeline on a seabed with a pipeline laying vessel according to any of the clauses 1-28 or 31-33, wherein the method comprises;
   placing the support device in the first mode when pipeline laying operations are performed, and
   placing the support device in the second mode when no pipeline laying operations are performed.

38. Method according to clause 37, wherein the method comprise placing the support device in the first mode by blocking a flow of hydraulic fluid in and out the hydraulic cylinders.

39. Method according to clause 37 or 38, wherein the method comprises placing the support device in the second mode by allowing a flow of hydraulic fluid in and out the hydraulic cylinders.

40. Method according to any of the clauses 37-39, wherein the method comprise placing the support device in the second mode by allowing a flow of hydraulic fluid between the hydraulic cylinders.

41. Method according to clause 37, wherein the method comprises;
   placing the support device in the first mode by tapping hydraulic fluid from the hydraulic cylinders to position the clamp on the rigid support in a fixed position relative to the positioning device, and
   placing the support device in the second mode by adding hydraulic fluid to the hydraulic cylinders to position the clamp at a distance from the rigid support and to allow the clamp to pivot relative to the positioning device.

42. Use of a pipeline laying vessel according to any of the clauses 1-28, 31-33.

43. Use of a pipeline laying system according to any of the clauses 29, 30, 34-36.

It will be apparent to those skilled in the art that various modifications can be made to the invention without departing from the scope of the invention.

The invention claimed is:

1. A pipeline laying vessel for laying a pipeline on a seabed, which pipeline laying vessel comprises;
   a hull,
   a positioning device for positioning a pipe section in a firing line along which the pipeline is laid, which positioning device is supported by the hull, and
   a clamp for holding the pipeline suspended from the vessel, wherein the clamp is located in the firing line, and comprises a support device constructed and arranged to allow the clamp to hold the pipeline in a first mode wherein the clamp has a fixed position relative to the positioning device, and in a second mode wherein the clamp is pivotable about a first pivot axis and a second pivot axis relative to the positioning device, and wherein the support device comprises a rigid support member and at least part of the clamp is in the first mode supported by the hull or the positioning device via the rigid support member.

2. The pipeline laying vessel according to claim 1, wherein the first pivot axis and the second pivot axis extend transverse, preferably substantially perpendicular, to each other.

3. The pipeline laying vessel according to claim 1, wherein the clamp in the second mode is pivotable over an angle of at least 2 degrees relative to the horizontal.

4. The pipeline laying vessel according to claim 1, wherein the rigid support member comprises a first support surface, the clamp comprises a second support surface and in the first mode the second support surface is positioned on the first support surface.

5. The pipeline laying vessel according to claim 4, wherein in the second mode the first support surface is positioned at a distance from the second support surface to allow the clamp to pivot relative to the positioning device.

6. The pipeline laying vessel according to claim 1, wherein the support device comprises two hydraulic cylinders comprising hydraulic fluid and supporting at least part of the clamp.

7. The pipeline laying vessel according to claim 6, wherein
in the first mode hydraulic fluid is tapped from the hydraulic cylinders to position the clamp on the rigid support member in a fixed position relative to the positioning device, and
in the second mode hydraulic fluid is added to the hydraulic cylinders to position the clamp at a distance from the rigid support member and to allow the clamp to pivot relative to the positioning device.

8. The pipeline laying vessel according to claim 1, wherein the support device comprises at least three hydraulic cylinders comprising hydraulic fluid and supporting at least part of the clamp.

9. The pipeline laying vessel according to claim 1, wherein the positioning device comprises a tower which in use extends upwardly from the hull.

10. The pipeline laying vessel according to claim 9, wherein the clamp is located near a lower part of the tower.

11. The pipeline laying vessel according to claim 1, wherein the clamp is a collar clamp or a friction clamp or a tensioner.

12. A pipeline laying system for laying a pipeline along a firing line and from a pipeline laying vessel comprising a hull, which pipeline laying system comprises;
a positioning device for in use positioning a pipe section in the firing line along which the pipeline is laid, which positioning device is constructed and arranged to in use be supported by the hull, and
a clamp for in use holding the pipeline suspended from the vessel, wherein the clamp is located in the firing line, and comprises a support device constructed and arranged to allow the clamp to hold the pipeline in a first mode wherein the clamp has a fixed position relative to the positioning device, and in a second mode wherein the clamp is pivotable about a first pivot axis and a second pivot axis relative to the positioning device, and wherein
the support device comprises a rigid support member and at least part of the clamp is in the first mode supported by the hull or the positioning device via the rigid support member.

13. A pipeline laying vessel for laying a pipeline on a seabed, which pipeline laying vessel comprises;
a hull, and
a pipeline laying system for laying the pipeline along a firing line, which pipeline laying system is supported by the hull, and comprises a clamp for holding the pipeline suspended from the vessel, the clamp is located in the firing line, and comprises a support device constructed and arranged to allow the clamp to hold the pipeline in a first mode wherein the clamp has a fixed position relative to the rest of the pipeline laying system, and in a second mode wherein the clamp is pivotable about a first pivot axis and a second pivot axis relative to the rest of the pipeline laying system, and wherein the support device comprises a rigid support member and at least part of the clamp is in the first mode supported by the hull or a positioning device via the rigid support member.

14. A pipeline laying system for laying a pipeline along a firing line and from a pipeline laying vessel comprising a hull, wherein
the pipeline laying system is constructed and arranged to in use be supported by the hull and comprises a clamp for holding the pipeline suspended from the vessel, and
the clamp is located in the firing line, and comprises a support device constructed and arranged to allow the clamp to hold the pipeline in a first mode, wherein the clamp has a fixed position relative to the rest of the pipeline laying system, and in a second mode wherein the clamp is pivotable about a first pivot axis and a second pivot as relative to the rest of the pipeline laying system, and wherein the support device comprises a rigid support member and at least part of the clamp is in the first mode supported by the hull or a positioning device via the rigid support member.

15. The pipeline laying system according to claim 14, wherein the pipeline laying system comprises the positioning device for positioning a pipe section in the firing line.

16. A method for laying a pipeline on a seabed with a pipeline laying vessel according to claim 6, wherein the method comprises;
placing the support device in the first mode when pipeline laying operations are performed, and
placing the support device in the second mode when no pipeline laying operations are performed.

17. The method according to claim 16, further comprising placing the support device in the second mode by allowing a flow of hydraulic fluid in and out the hydraulic cylinders.

18. The method according to claim 16, further comprising placing the support device in the second mode by allowing a flow of hydraulic fluid between the hydraulic cylinders.

19. The method according to claim 16, further comprising:
placing the support device in the first mode by tapping hydraulic fluid from the hydraulic cylinders to position the clamp on the rigid support member in a fixed position relative to the positioning device, and
placing the support device in the second mode by adding hydraulic fluid to the hydraulic cylinders to position the clamp at a distance from the rigid support member and to allow the clamp to pivot relative to the positioning device.

* * * * *

UNITED STATES PATENT AND TRADEMARK OFFICE
CERTIFICATE OF CORRECTION

| | |
|---|---|
| PATENT NO. | : 9,097,368 B2 |
| APPLICATION NO. | : 14/009085 |
| DATED | : August 4, 2015 |
| INVENTOR(S) | : Cornelis Van Zandwijk |

It is certified that error appears in the above-identified patent and that said Letters Patent is hereby corrected as shown below:

Claims:

Column 14, Claim 14, Line 19, please delete "as" and insert -- axis -- therefor.

Signed and Sealed this
Twelfth Day of January, 2016

Michelle K. Lee
*Director of the United States Patent and Trademark Office*